(12) United States Patent
Hecker et al.

(10) Patent No.: US 7,568,713 B2
(45) Date of Patent: Aug. 4, 2009

(54) AIR-SUSPENSION SYSTEM FOR VEHICLES, HAVING A THROTTLE

(75) Inventors: Falk Hecker, Markgroeningen (DE); Guenther Fecht, Freiberg (DE); Winfried Geiger, Muehlacker (DE); Friedbert Roether, Cleebronn (DE)

(73) Assignee: Knorr-Bremse Systeme für Nutzfahrzeuge GmbH, München (DE)

( * ) Notice: Subject to any disclaimer, the term of this patent is extended or adjusted under 35 U.S.C. 154(b) by 527 days.

(21) Appl. No.: 11/476,394

(22) Filed: Jun. 27, 2006

(65) Prior Publication Data

US 2007/0085292 A1    Apr. 19, 2007

(30) Foreign Application Priority Data

Jun. 28, 2005   (DE)  ....................... 10 2005 030 467

(51) Int. Cl.
 *B60G 11/26*  (2006.01)
(52) U.S. Cl. ..................... 280/124.157; 280/124.16; 267/64.16; 267/64.28
(58) Field of Classification Search .......... 280/124.157, 280/124.158, 124.159, 124.16, 6.15, 6.151, 280/6.153, 6.159, 6.157; 267/64.28, 64.11, 267/64.16, 64.17
See application file for complete search history.

(56) References Cited

U.S. PATENT DOCUMENTS

| | | | |
|---|---|---|---|
| 6,189,903 B1 * | 2/2001 | Bloxham | ............... 280/124.16 |
| 6,513,820 B2 * | 2/2003 | Schoop | ................ 280/124.157 |
| 7,396,029 B2 * | 7/2008 | Hecker et al. | .......... 280/124.16 |
| 7,441,789 B2 * | 10/2008 | Geiger et al. | .......... 280/124.16 |
| 2002/0079626 A1 * | 6/2002 | Grotendorst et al. | ..... 267/64.19 |
| 2002/0153688 A1 * | 10/2002 | Jurr et al. | ................ 280/124.16 |
| 2003/0132594 A1 * | 7/2003 | Den Hartog | ........... 280/124.16 |
| 2004/0188970 A1 * | 9/2004 | Matern et al. | .......... 280/124.16 |
| 2006/0043691 A1 * | 3/2006 | Geiger | ................ 280/124.16 |
| 2006/0049606 A1 * | 3/2006 | Geiger et al. | ......... 280/124.157 |

* cited by examiner

*Primary Examiner*—Paul N. Dickson
*Assistant Examiner*—Drew J. Brown
(74) *Attorney, Agent, or Firm*—Kenyon & Kenyon LLP

(57) ABSTRACT

An air-suspension system for vehicles, in particular for commercial vehicles, including at least one air-bellows valve assigned to an air-spring bellows or a group of air-spring bellows of the front axle for individually aerating and venting this air-spring bellows or this group of air-spring bellows; at least one air-bellows valve assigned to an air-spring bellows or a group of air-spring bellows of the rear axle for individually aerating and venting this air-spring bellows or this group of air-spring bellows; as well as at least one central aeration valve for supplying the air-bellows valves assigned to the air-spring bellows of the front axle and the rear axle with compressed air from a compressed-air supply; and at least one central venting valve for exhausting compressed air from the air-bellows valves assigned to the air-spring bellows of the front axle and the rear axle, to an air vent. The system provides that the compressed-air communication between, on one side, the compressed-air supply, the central aeration valve, and the at least one air-bellows valve assigned to the front axle and, on the other side, the air vent, the central venting valve, and the at least one air-bellows valve assigned to the rear axle take place via at least one throttle.

8 Claims, 1 Drawing Sheet

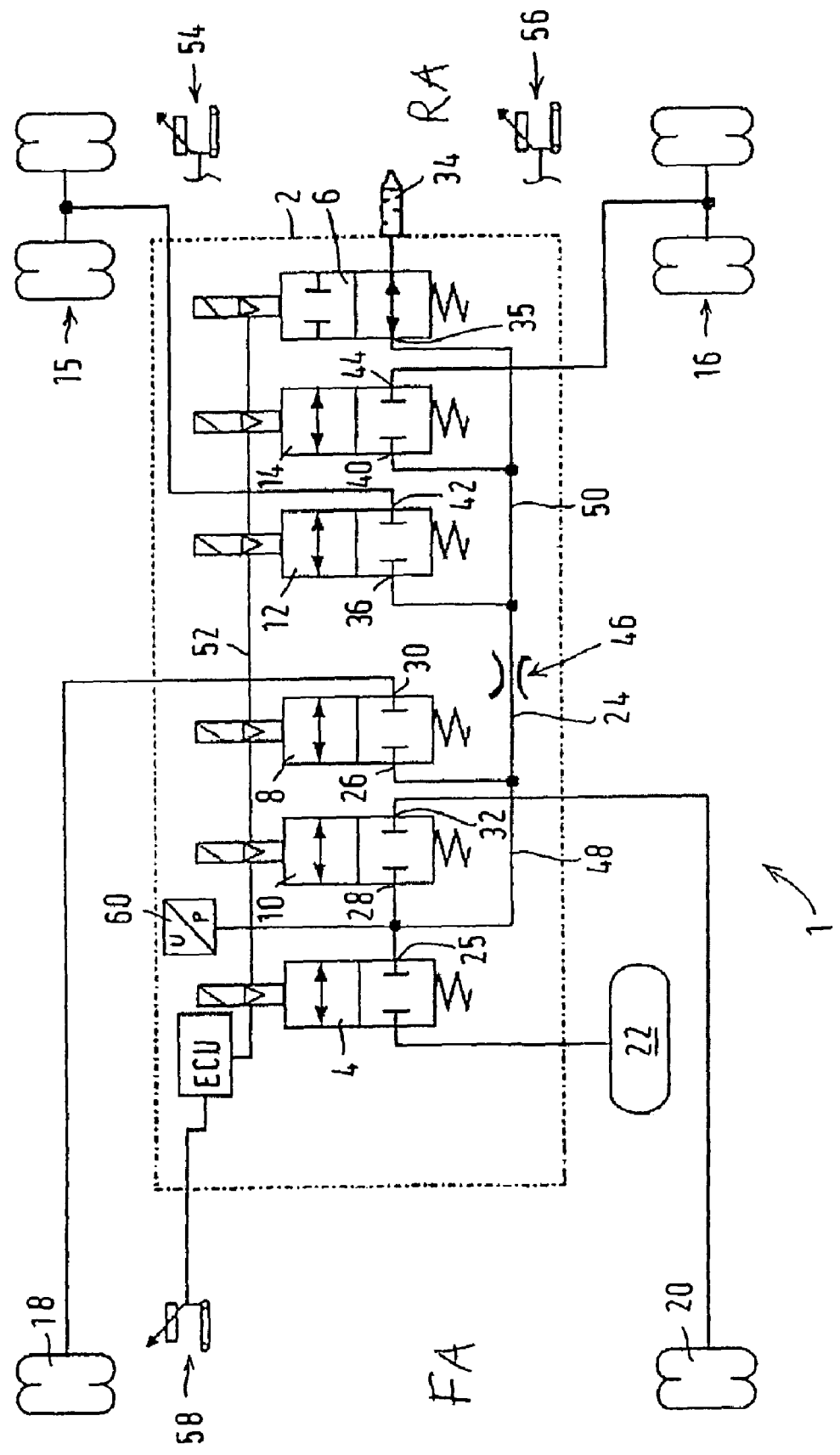

AIR-SUSPENSION SYSTEM FOR VEHICLES, HAVING A THROTTLE

FIELD OF THE INVENTION

The present invention relates to an air-suspension system for vehicles, in particular for commercial vehicles, including at least one air-bellows valve assigned to an air-spring bellows or a group of air-spring bellows of the front axle for individually aerating or venting this air-spring bellows or this group of air-spring bellows; at least one air-bellows valve assigned to an air-spring bellows or group of air-spring bellows of the rear axle for individually aerating and venting this air-spring bellows or group of air-spring bellows; as well as at least one central aeration valve for supplying the air-bellows valves assigned to the air-spring bellows of the front axle and the rear axle with compressed air from a compressed-air supply; and at least one central venting valve for exhausting compressed air from the air-bellows valves assigned to the air-spring bellows of the front axle and the rear axle, to an air vent.

BACKGROUND INFORMATION

In the loaded and unloaded states, heavy commercial vehicles have a non-uniform weight distribution with respect to the loads acting on the rear axle and the front axle. While the load on the rear axle is substantially removed in the unloaded state, the load of the driver's cab, along with the units and the driving engine, acts on the front axle. In the loaded state, the load acting on the rear axle is often greater than that acting on the front axle. Consequently, a commercial vehicle would rise and fall at different rates at the front axle and the rear axle, as a function of the loading state. In contrast, in order to achieve uniform raising or lowering, the air-bellows valves assigned to the air-spring bellows at the front axle and the rear axle are pressurized at a relatively high pulse frequency. However, this has the disadvantage of a high mechanical loading of the air-bellows valves. In addition, the different raising and lowering rates may not always be compensated for by this measure.

SUMMARY OF THE INVENTION

An object of the present invention is to further develop an air-suspension system of the type mentioned at the outset, so that it is possible to uniformly raise and lower a vehicle at the front axle and the rear axle in both the loaded and unloaded states.

This object of the present invention is achieved by the features described herein.

According to a first exemplary embodiment of the present invention, there is compressed-air communication between the compressed-air supply, the central aeration valve, and the at least one air-bellows valve assigned to the front axle, on the one side, and the air vent, the central venting valve, and the at least one air-bellows valve assigned to the rear axle takes place via at least one throttle (air restrictor).

According to another exemplary embodiment, the throttle may also be situated between, on the one side, the compressed-air supply, the central aeration valve, and the at least one air-bellows valve assigned to the rear axle and, on the other side, the air vent, the central venting valve, and the at least one air-bellows valve assigned to the front axle. Which of the two alternatives is more suitable for achieving the object of the present invention is, in each instance, a function of the distribution of the weight on the front axle and rear axle, i.e. a function of where pressure should be increased or decreased more rapidly, in order to ensure uniform raising and lowering.

As a result of the throttle and the set-up of the central aeration valve and the central venting valve, the times required for increasing or decreasing the pressure in the air-spring bellows of the front axle and the rear axle are different. In the case of suitable dimensioning of the flow cross-section of the throttle, which may be manufactured as a throttle having an adjustable flow cross-section or as a throttle having a fixed flow cross-section, an identical raising and lowering rate at the front axle and rear axle may be set. This also has the advantage that the pulse frequency of the air-bellows valves may be reduced, which has a positive effect on their service life.

The measures set forth herein allow further advantageous developments and improvements of the exemplary embodiments of the present invention as described herein.

It is particularly desirable for the throttle to be situated in a compressed-air line, which is in fluid communication with connections of the air-bellows valves, the central aeration valve, and the central venting valve.

According to a further measure, at least the air-bellows valves, the central aeration valve, the central venting valve, the air vent, and the throttle may be integrated in a valve block, which produces an advantageously compact size.

It is particularly desirable for the central aeration valve to take the form of a 2/2-way directional control valve, which switches the supply through to the air-bellows valves or blocks this flow path. The central venting valve is likewise a 2/2-way directional control valve, which switches the air vent through to the air-bellows valves or blocks this flow path. Last but not least, a 2/2-way directional control valve in the form of an air-bellows valve is also assigned to the air-spring bellows of each side of the vehicle at at least the rear axle and the front axle. For the purpose of electrical control, at least some of the valves take the form of solenoid valves.

Further details are derived from the description of the exemplary embodiments of the present invention as described herein.

BRIEF DESCRIPTION OF THE DRAWING

The FIGURE shows a schematic functional circuit diagram of an air-suspension system according to an exemplary embodiment of the present invention.

DETAILED DESCRIPTION

The specific embodiment of an air-suspension system of a commercial vehicle, denoted in FIG. 1 by reference numeral 1, includes a valve block 2, which is assigned to a driven rear axle RA and a steered front axle FA and is symbolized in the figure by the rectangle marked by a dot-dash line. It includes a central aeration valve 4, a central venting valve 6, as well as, for example, four air-bellows valves 8, 10, 12, 14, of which each is assigned to an air-spring bellows or group of air-spring bellows. For example, one pair of air-spring bellows 15, 16 is provided for each side of rear axle RA, and one air-spring bellows 18, 20 is provided for each side of front axle FA. In general, the volume of air and/or the number of air-spring bellows 15, 16 at rear axle RA may be greater than the volume of air and/or the number of air-spring bellows 18, 20 at front axle FA, since in the loaded state, rear axle RA is normally more highly loaded and a higher volume of air produces a greater supporting force.

Central aeration valve 4 either connects a compressed-air supply 22 to a central compressed-air line 24 or a rail or blocks this flow path. A pressure outlet 25 of central aeration valve 4 and pressure inlets 26, 28 of air-bellows valves 18, 20 assigned to front axle FA are connected to central compressed-air line 24, a pressure outlet 30 of the one air-bellows valve 8 being in fluid communication with right air-spring bellows 18 of front axle FA, and a pressure outlet 32 of other air-bellows valve 10 being in fluid communication with left air-spring bellows 20 of front axle FA.

Central venting valve 6 either connects an air vent 34 to central compressed-air line 24 or blocks this flow path. A pressure outlet 35 of central venting valve 6 and, in addition, pressure inlets 36, 40 of air-bellows valves 12, 14 assigned to rear axle RA are then connected to compressed-air line 24, a pressure outlet 42 of the one air-bellows valve 12 being in fluid communication with right pair of air-spring bellows 15 of rear axle RA, and a pressure outlet 44 of other air-bellows valve 14 being in fluid communication with left pair of air-spring bellows 16 of rear axle RA.

According to a first variant, the compressed-air communication between, on one side, compressed-air supply 22, central aeration valve 4, and air-bellows valves 8, 10 assigned to front axle FA and, on the other side, air vent 34, central venting valve 6, and air-bellows valves 12, 14 assigned to rear axle RA takes place via a throttle 46, which is situated in central compressed-air line 24. This situation is represented in the figure. This variant is more favorable, when the weight resting on front axle FA is generally greater than that resting on rear axle RA.

Consequently, on one side, the compressed air, which flows from compressed-air supply 22 through central aeration valve 4 into air-spring bellows 15, 16 of rear axle RA, as well as the compressed air, which should be exhausted from air-spring bellows 18, 20 of front axle FA via central venting valve 6, through air vent 34, into the atmosphere, should flow through throttle 46. On the other side, air-spring bellows 18, 20 of front axle FA are aerated with compressed air from compressed-air supply 22, via switched-through central aeration valve 4 and switched-through air-bellows valves 8, 10 of front axle FA, and air-spring bellows 15, 16 of rear axle RA are vented via switched-through central venting valve 6 and switched-through air-bellows valves 12, 14 of rear axle RA without throttling. Central compressed-air line 24 is then divided into two parts by throttle 46, namely into, on one side, a first segment 48 assigned to the side having compressed-air supply 22, central aeration valve 4, and air-bellows valves 8, 10 and air-spring bellows. 18, 20 of front axle FA, and, on the other side, into a second segment 50 assigned to air vent 34, central venting valve 6, and air-bellows valves 12, 14 and air-spring bellows 15, 16 of rear axle RA.

According to a second, mirror-image variant, throttle 46 may also be situated between, on one side, compressed-air supply 22, central aeration valve 4, and the at least one air-bellows valve 12, 14 assigned to rear axle RA, and, on the other side, air vent 34, central venting valve 6, and the at least one air-bellows valve 8, 10 assigned to front axle FA. This variant is more favorable, when the weight resting on rear axle RA is generally greater than that resting on front axle FA.

In both cases, throttle 46 may be manufactured as a throttle having an adjustable flow cross-section or as a throttle having a fixed flow cross-section. In addition, air-bellows valves 8, 10, 12, 14, central aeration valve 4, central venting valve 6, air vent 34, and throttle 46 may be integrated in valve block 2. Central compressed-air line 24 then takes the form of, e.g., a compressed-air channel in valve block 2.

All valves 4, 6, 8, 10, 12, 14 preferably take the form of electrically controlled solenoid valves, i.e., they are each activated by an electronic control unit ECU via an electrical control line 52, e.g. a data bus. Three level sensors, one level sensor 54 assigned to the right side of rear axle RA, one level sensor 56 assigned to the left side of rear axle RA, as well as one level sensor 58 assigned to front axle FA, measure the distance between front axle FA or rear axle RA and a vehicle body with the aid of rotary potentiometers, whose voltage taps are each connected to front axle FA or rear axle RA via an actuating lever. Level sensors 54, 56, 58 are connected to electronic control unit ECU so as to allow signal transmission. In addition, electronic control unit ECU is combined with valve block 2 to form a unit, in that, for example, these modules are accommodated in a common housing made of plastic or die-cast aluminum. A pressure sensor 16 measures the pressure in central pressure line 24 and supplies a corresponding pressure signal to electronic control unit ECU, which consequently adjusts a load-dependent and level-dependent pressure in air-spring bellows 15, 16, 18, 10 by opening and closing solenoid valves 4, 6, 8, 10, 12, 14.

Against this background, the method of functioning of air-suspension system 1 according to the present invention is as follows:

Starting out from the above-described, first variant of air-suspension system 1 shown in the figure, and a depressed level that is desired, for example, for hitching a tractor vehicle, a higher level shall be set. The levers connected to rear axle RA and front axle FA have then rotated the sliders of the rotary potentiometers of level sensors 54, 56, 58, on the respective potentiometer paths, into the "raising" position. Control unit ECU detects the voltage deviation and simultaneously transmits electrical actuating signals to central venting valve 6, which consequently closes the flow path to air vent 34, as well as to central aeration valve 4 and air-bellows valves 8, 10, 12, 14 of rear axle RA and front axle FA, which are switched into the through (flow through) position. The latter are cycled between the opened and closed position.

Throttle 46 causes the pressure in first segment 48 assigned to front axle FA to be initially greater than in second segment 50 of central compressed-air line 24, assigned to rear axle RA, which results in the pressure in air-spring bellows 18, 20 of more highly loaded front axle FA increasing more rapidly than in air-spring bellows 15, 16 of less loaded rear axle RA, since the compressed air flows unthrottled into air-spring bellows 18, 20 of front axle FA, but flows throttled into air-spring bellows 15, 16 of rear axle RA. Also contributing to this is the fact that, with respect to the pressure, the volume of air to be increased in air-spring bellows 15, 16 of rear axle RA is greater than in air-spring bellows 18, 20 of front axle FA, since two rear-axle air-spring bellows 15, 16 are present per side, whereas only one is present per side at front axle FA. By appropriately dimensioning throttle 46, which one skilled in the art adapts to the specific vehicle in the individual case, the vehicle body may then rise equally rapidly in the region of front axle FA and rear axle RA, although an unequal load distribution is present. In this context, air-bellows valves 8, 10, 12, 14 of front axle FA and rear axle RA are switched in a synchronized (cycled) manner until the desired level is reached.

In the other case, i.e. when rear axle RA is generally more highly loaded and front axle FA is less loaded, the above-described second variant is more favorable, where throttle 46 is situated between, on one side, compressed-air supply 22, central aeration valve 4, and the at least one air-bellows valves 12, 14 assigned to rear axle RA, and, on the other side, air vent 34, central venting valve 6, and the at least one air-bellows valve 8, 10 assigned to front axle FA. In this case, air-spring bellows 15, 16 of more highly loaded rear axle RA are aerated more rapidly than those of front axle FA, which then results in a uniform raising motion.

To lower the level of the vehicle body, the levers connected to the vehicle axles rotate the sliders of the rotary potentiometers of level sensors 54, 56, 58, on the respective potentiometer paths, to the "lowering" position. Control unit ECU detects the voltage deviation and transmits electrical actuating signals to central aeration valve 4, central venting valve 6, and air-bellows valves 8, 10, 12, 14 of front axle FA and rear axle RA. Central aeration valve 4 is then switched into the closed position, and central venting valve 6 and all air-bellows valves 8, 10, 12, 14 are switched into the flow-through position, the latter preferably in a synchronized (cycled) manner.

When the vehicle body is lowered, then, in the installation situation according to the first variant, throttle 46 ensures that the pressure in air-spring bellows 15, 16 of rear axle RA decreases more rapidly than in air-spring bellows 18, 20 of front axle FA, since the compressed air is fed from the former unthrottled, but from the latter through throttle 46, to air vent 34. In the region of more highly loaded front axle FA, which would otherwise sink more rapidly than the vehicle body in the region of more lightly loaded rear axle RA due to the higher weight, this causes the vehicle body to sink more slowly and approximately at the same rate as the region of the vehicle body at the rear axle.

In the opposite case of the second variant, however, the vehicle body at heavier rear axle RA would sink more rapidly than the vehicle body at lighter front axle FA, if throttle 46 does not ensure that air-spring bellows 15, 16 of rear axle RA are prevented from rapidly venting.

By appropriately controlling air-bellows valves 8, 10, 12, 14 of rear axle RA and front axle FA in an individual manner, the levels of the two vehicle sides may be variably adjusted, which can be necessary in the case of eccentric loading. In the same way, a different level at rear axle RA and at front axle FA is possible by appropriately controlling the air-bellows valves. Therefore, the described set-up of air-suspension system 1 allows not only individual control, but also constant-pressure control to be implemented, by activating the two air-bellows valves 8, 10, 12, 14 of front axle FA and rear axle RA simultaneously and from side to side, a switchover being made between the right and left sides of the vehicle in an alternating manner. The specific control algorithm may optionally be programmed in control unit ECU. Last but not least, the commercial vehicle may also be provided with a lifting axle, which is also cushioned by air-spring bellows that, together with the corresponding air-bellows valves, are then part of air-suspension system 1 as well.

The List of the Reference Numbers is as follows:

1 air-suspension system
    2 valve block
    4 aeration valve
    6 venting valve
    8 right FA air-bellows valve
    10 left FA air-bellows valve
    12 right RA air-bellows valve
    14 left RA air-bellows valve
    15 right RA air-spring bellows
    16 left RA air-spring bellows
    18 right FA air-spring bellows
    20 left FA air-spring bellows
    22 compressed-air supply
    24 compressed-air line
    25 pressure outlet
    26 pressure inlet
    28 pressure inlet
    30 pressure outlet
    32 pressure outlet
    34 air vent
    35 pressure outlet
    36 pressure inlet
    40 pressure inlet
    42 pressure outlet
    44 pressure outlet
    46 throttle
    48 first segment
    50 second segment
    52 control line
    54 level sensor
    56 level sensor
    58 level sensor
    60 pressure sensor

What is claimed is:

1. An air-suspension system for a vehicle, comprising:
at least one front axle air-bellows valve assigned to at least one air-spring bellows of a front axle for individually aerating and venting the at least one air-spring bellows of the front axle;
at least one rear axle air-bellows valve assigned to at least one air-spring bellows of a rear axle for individually aerating and venting the at least one air-spring bellows of the rear axle;
at least one central aeration valve for supplying the at least one air-bellows valves assigned to the at least one air-spring bellows of the front axle and the rear axle with compressed air from a compressed-air supply; and
at least one central venting valve for exhausting compressed air from the at least one air-bellows valves assigned to the at least one air-spring bellows of the front axle and the rear axle, to a compressed-air supply;
wherein one of the following is satisfied:
the compressed-air communication between, on one side, the compressed-air supply, the central aeration valve, and the at least one air-bellows valve assigned to the front axle and, on the other side, an air vent, the central venting valve, and the at least one air-bellows valve assigned to the rear axle occurs via at least one throttle; or
the compressed-air communication between, on one side, the compressed-air supply, the central aeration valve, and the at least one air-bellows valve assigned to the rear axle and, on the other side, the air vent, the central venting valve, and the at least one air-bellows valve assigned to the front axle, occurs via the at least one throttle.

2. The air-suspension system of claim 1, wherein the throttle is a throttle having one of an adjustable flow cross-section and a fixed flow cross-section.

3. The air-suspension system of claim 1, wherein the throttle is situated in a compressed-air line, which is in fluid communication with connections of the air-bellows valves, the central aeration valve, and the central venting valve.

4. The air-suspension system of claim 1, wherein at least the air-bellows valves, the central aeration valve, the central venting valve, the air vent, and the throttle are integrated in a valve block.

5. The air-suspension system of claim 1, wherein the central aeration valve is a 2/2-way directional control valve, which switches the compressed-air supply through to the air-bellows valves or blocks this flow path.

6. The air-suspension system of claim 1, wherein the central venting valve is a 2/2-way directional control valve, which switches the air vent through to the air-bellows valves or blocks this flow path.

7. The air-suspension system of claim 1, wherein the air-spring bellows of each side of the vehicle are assigned a 2/2-way directional control valve as an air-bellows valve at at least the rear axle and the front axle.

8. The air-suspension system of claim 1, wherein at least some of the valves include electrically controllable solenoid valves.

* * * * *

UNITED STATES PATENT AND TRADEMARK OFFICE
CERTIFICATE OF CORRECTION

PATENT NO.       : 7,568,713 B2                                         Page 1 of 1
APPLICATION NO. : 11/476394
DATED            : August 4, 2009
INVENTOR(S)      : Hecker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 565 days.

Signed and Sealed this

Seventh Day of September, 2010

David J. Kappos
*Director of the United States Patent and Trademark Office*